United States Patent [19]
Truax et al.

[11] Patent Number: 5,402,741
[45] Date of Patent: Apr. 4, 1995

[54] SEED PLANTER

[76] Inventors: James R. Truax, 3717 Vera Cruz Ave.; Jeffrey A. McClellan, 2909 Vera Cruz Ave.; Dean E. Ternus, 3331 Zane Ave. N., all of Crystal, Minn. 55422; Larry D. McClellan, 6059 W. Broadway, New Hope, Minn. 55428; Michael J. Kaluza, 3319 Zane Ave. N., Crystal, Minn. 55422

[21] Appl. No.: 63,874

[22] Filed: May 18, 1993

[51] Int. Cl.⁶ .............................................. A01C 7/20
[52] U.S. Cl. ........................................ 111/172; 111/170
[58] Field of Search ........................... 111/170-172, 111/34, 36, 901; 222/415, 185

[56] References Cited

U.S. PATENT DOCUMENTS

| | | | |
|---|---|---|---|
| 972,919 | 10/1910 | Richter | 111/171 |
| 1,035,791 | 8/1912 | Hist | 111/172 |
| 3,077,290 | 2/1963 | Rehder | 111/172 |
| 4,030,428 | 6/1977 | Truax | . |
| 4,042,114 | 8/1977 | Avild et al. | 111/170 |
| 4,450,778 | 5/1984 | Quick | 111/172 |

FOREIGN PATENT DOCUMENTS 1463159 3/1989 U.S.S.R. ............... 111/171

OTHER PUBLICATIONS

*Holland Transplanter*, 1987, Catalog No. 15/87.

*Primary Examiner*—Dennis L. Taylor
*Assistant Examiner*—Spencer Warnick
*Attorney, Agent, or Firm*—Burd, Bartz & Gutenkauf

[57] ABSTRACT

A seed planter for planting of large or irregular seeds. A housing is mounted on a frame. The frame carries ground working equipment for opening, planting and closing a seed slot. The housing includes interior walls and partitions that divide it into a seed box and a collector. The collector leads to a seed drop opening to deliver seeds for planting in the open seed slot. The seed box has a single seed bin or can be divided into multiple seed bins. A gathering chain is associated with each seed bin. Each gathering chain has one or more seed cups. The gathering chain is positioned to move the seed cups through an inlet opening in each seed bin, up through the seed bin where the seed cup can pick a seed, and out of the seed bin to drop the seed into the collector. The seed cups can be relatively spaced on the gathering chain, and with respect to cup on the other gathering chains, to regulate the spacing between seeds being deposited. Seeds of different species can be located in the various seed bins.

27 Claims, 6 Drawing Sheets

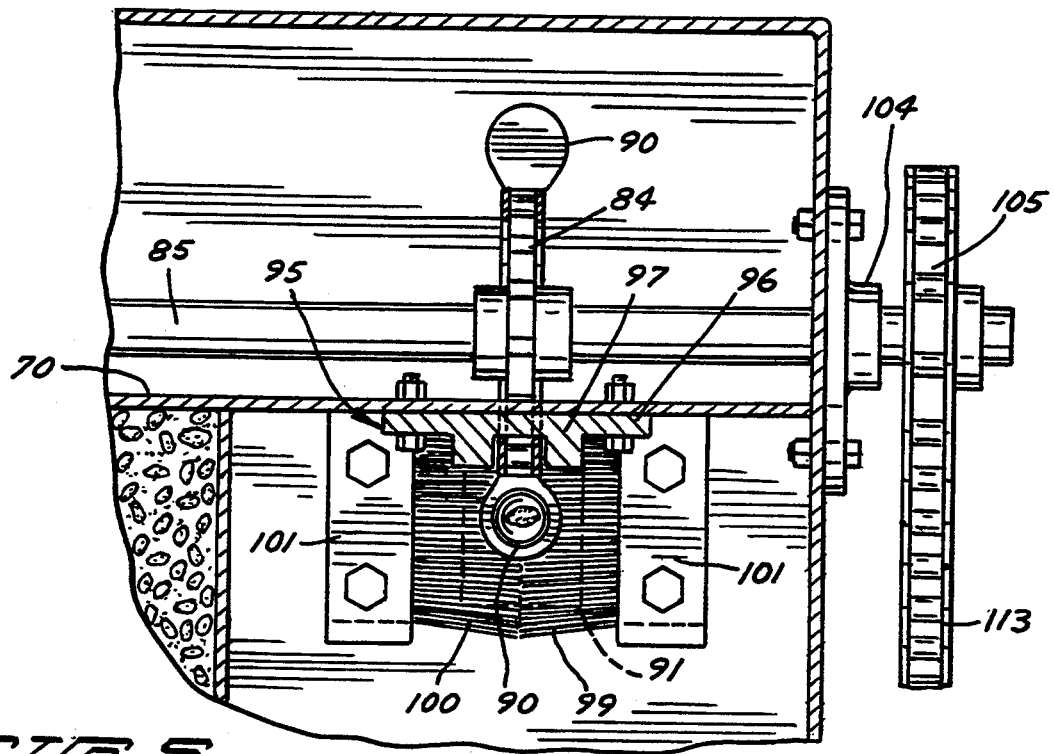
FIG. 5
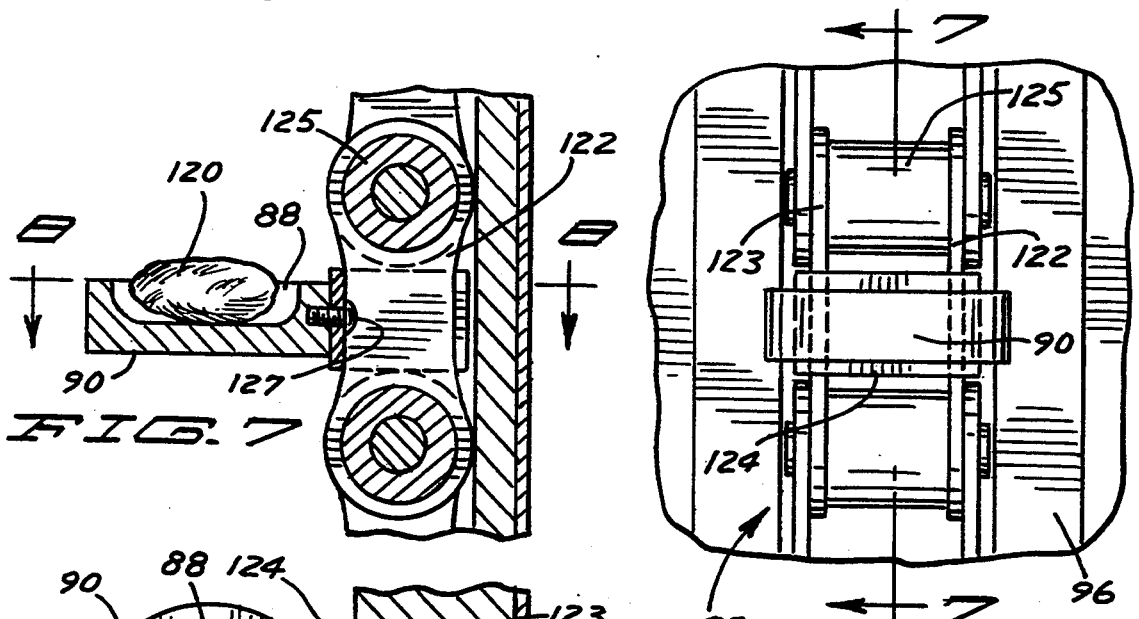
FIG. 7
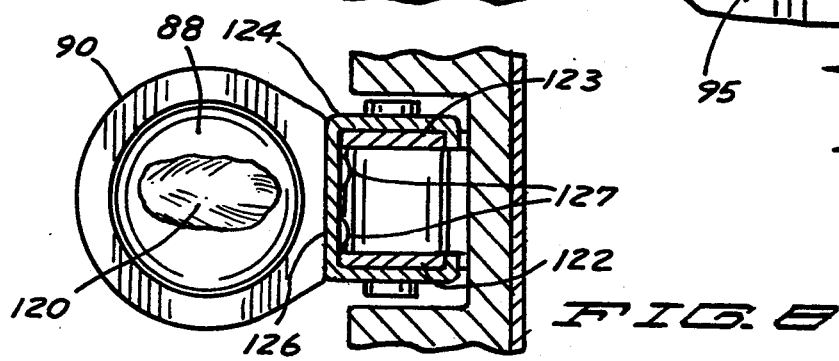
FIG. 6
FIG. 8

SEED PLANTER

BACKGROUND OF THE INVENTION

The invention relates to the planting of large or irregular seeds and in particular to the planting of seeds for trees as in conjunction with a reforestation effort. This could include, for example, planting multiple hardwood tree species in wetlands, such as oak, walnut, hickory and ash. In a wildlife habitat, this can include planting deciduous trees along with evergreen trees. Current tree planting machines suffer from certain disadvantages. These machines plant tree seeds one at a time at a uniform spacing that cannot readily be varied. Due to the size and shape of the seeds, there is commonly a problem of seed bridging in the hopper whereby seeds tend to interconnect and remain poised above the seed drop opening in the seed hopper. Prior art machines plant one species of tree seed at a time. Due to the vulnerability of any one species of tree to disease or predatory pests, it has been found desirable to intermix tree species when planting.

SUMMARY OF THE INVENTION

The invention relates to a seed planter particularly adapted for planting of large or irregular seeds. The planter is also adept at the planting of smaller seeds. In particular, the seed planter is adapted for planting of tree seeds. The seed planter has one or more seed bins to store seeds. A multiple of bins can contain seeds of various tree species. The planter selectively dispenses seeds from the various bins for planting. This permits selectively intermixing of seeds being planted along a row so as to vary the species being planted. Seeds are picked from individual bins and dropped into a collector where the seed travels to a seed drop tube. The picking of seeds from an individual bin is metered according to the desired spacing between plantings of seeds from that bin.

The planter includes a frame assembly for travelling over the ground and opening, planting and closing a seed furrow or seed slot. The frame assembly can be constructed according to various configurations according to the nature of the terrain, the nature of the seeds to be planted, and other considerations. A seed planter housing is mounted on the frame. It is divided by interior walls into a seed box and a seed collector chamber. The seed box can be divided into a plurality of seed bins, each of which can be supplied with a different species of seed, or a fertilizer pellet, or the like.

A seed picking assembly is associated with each seed bin. Each seed picking assembly includes an endless loop gathering chain. The gathering chain carries a plurality of seed cups, each seed cup designed to pick one seed at a time from the seed bin. The chain moves upwardly through the seed bin. As it does, the cup picks up a seed. The seed and cup move on the chain upwardly toward the top of the seed bin. The chain and seed cup pass through an opening in the front wall of the seed bin. As a chain passes over a sprocket, it reverses direction and the seed cup is inverted, releasing the seed. The seed is dropped in a collector chamber where it travels by gravity to a seed drop opening and a seed drop tube. Seeds from the other seed bins are likewise dropped into the collector chamber. The frequency of seed drop from any bin can be regulated by the number of seed cups on the chain. This regulates the spacing between seeds. The relative spacing of seed cups on the various gathering chains regulates the spacing between seeds from the different bins.

IN THE DRAWINGS

FIG. 5 is an enlarged sectional view of a portion of the seed planter of FIG. 4 taken along the line 5—5 thereof;

FIG. 6 is an enlarged view of one of the seed cups of the seed planter shown in FIG. 4 attached to a link of a gathering chain;

FIG. 7 is a sectional view of a portion of the seed cup and chain link of FIG. 6 taken along the line 7—7 thereof;

FIG. 8 is a view of a portion of the seed cup and chain link of FIG. 7 taken along the line 8—8 thereof;

DESCRIPTION OF A PREFERRED EMBODIMENT

Figure 1:
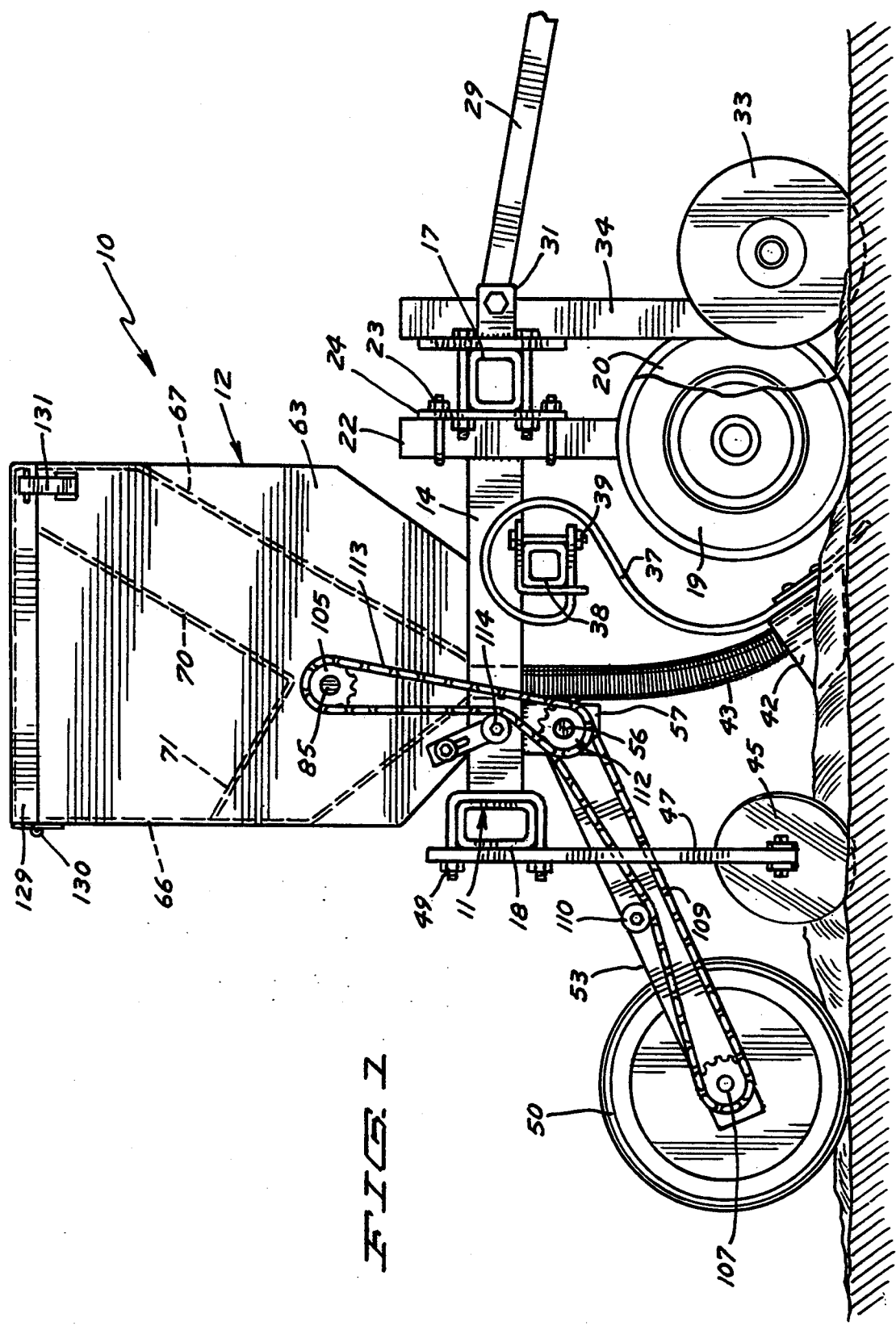
FIG. 1 is a side elevational view of a seed planter according to the invention shown in working relationship to the ground and shown partly fragmented for purposes of illustration.
Figure 2:
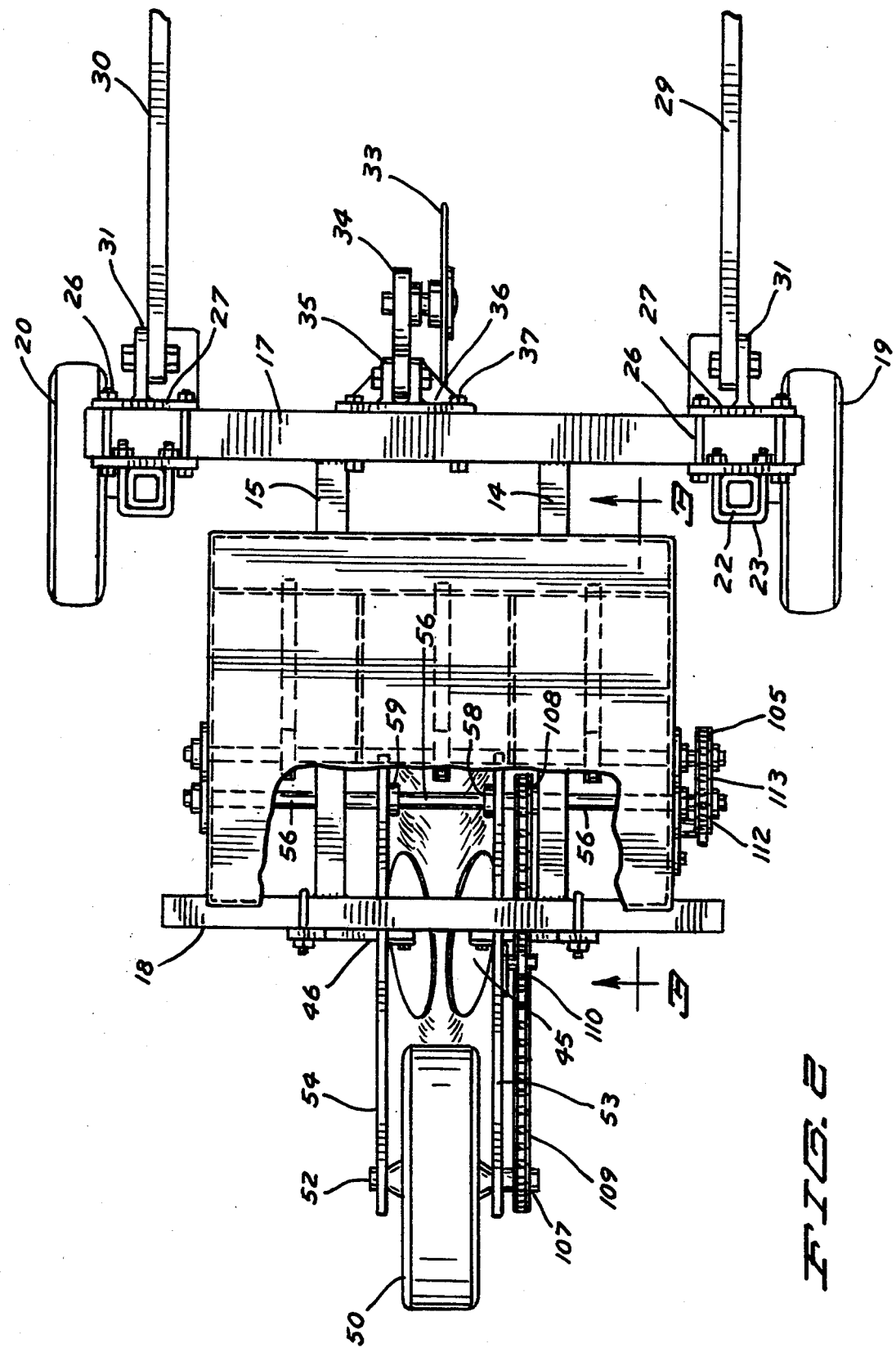
FIG. 2 is a top plan view of the planter of FIG. 1 partly fragmented for purposes of illustration.

Referring to the drawings, there is shown in FIGS. 1 and 2 a seed planter according to the invention indicated generally at 10 and including a unitary frame 11 carrying a seed planting housing 12. Frame 11 is generally horizontal and includes first and second longitudinal side beams 14 and 15 connected as by welding, to a lateral forward beam 17 and a lateral rear beam 18. Ends of forward and rear beams 17 and 18 extend laterally beyond the ends of the side beams 14, 15 for purposes of carrying ground engaging equipment. Frame 11 carries ground engaging equipment for continuously opening a seed slot, depositing seed in the seed slot, and closing the seed slot. The frame is unitary in nature in order that different attachments may be easily placed upon it allowing for varying the assortment of ground engaging equipment to be equipped upon the seed planter according to the nature of the seeds to be planted and the terrain to be engaged.

In the particular configuration of seed planter shown, frame 11 carries a no-till blade to slice trash ahead of the furrow opener; a chisel tine furrow opener in order to open a furrow or seed slot for planting of large sized or irregular seeds; a planting shoe attached behind it connected to a seed tube; and, a pair of covering disks in trailing relationship to the planting shoe for covering the planted seed slot, followed by a ground wheel.

First and second forward support wheels 19, 20 are mounted to the ends of the forward frame beam 17 that are extended laterally beyond the longitudinal frame members 14, 15. As shown in FIG. 1, each wheel 19 is mounted on a support leg 22 that is assembled by U-bolt assemblies 23 to a plate 24 fixed to the end of the lateral forward beam 17.

First and second draw bars 29, 30 are fixed proximate the lateral ends of the lateral forward frame members 17. Ends of draw bars 29, 30 are pivotally connected to mounting lugs 31 fixed to plates 27 that are attached by nut and bolt assemblies 26 to the ends of the forward lateral frame member 17. The draw bars 29, 30 are connectable in conventional fashion to a suitable prime mover, such as a tractor.

A no-till disk 33 is centrally mounted on frame 11 positioned to precede the other ground engaging equipment and slice through trash ahead of the furrow opening equipment. Disk 33 is rotatably mounted to the lower end of a disk support leg 34. The upper end of disk support leg 34 is fixed to a twin member bracket 35 that is welded to a plate 36 which in turn is fixed to the lateral forward beam 17 by nut and bolt assemblies 37.

As shown in FIG. 1, a chisel tine opener 37 is mounted to a transverse opener support member 38 that is extended between the longitudinal frame members 14, 15 and secured thereto by suitable means. The upper end 37A (FIG. 3) of chisel tine opener 37 is secured to the transverse support member 38 by a suitable bolt and L-shaped bracket assembly 39. The lower end 41 of the chisel tine opener is positioned to penetrate the ground behind the trash disk 33 and open a furrow or seed slot suitable for planting seed. Other suitable furrow openers can be used, such as a double disk opener.

A planting shoe 42 is fixed proximate the lower end of the chisel tine opener 37 and rearwardly thereof. The planting shoe 42 is positioned to engage a seed slot opened by the lower end 41 of the chisel tine opener 37 and hold the seed slot open while seeds drop through a seed tube 43 to the bottom of the furrow, preventing dirt that would otherwise drop back into the seed slot from doing so until after the seed is planted. The seed tube 43 is connected at its lower end to the planting shoe 42.

First and second furrow closing or covering disks are mounted to the frame 11 in trailing relationship to the planting shoe 43 to move dirt back into the seed slot to cover the planted seed. Covering disks 45, 46 are mounted on the lower ends of covering disk legs 47. The covering disks 45, 46 are circular, but are mounted in a canted relationship toward the open furrow and toward one another in order to move the dirt back into the seed slot. Covering disk legs 47 are attached to the rear lateral frame member 18 at the outward extremities thereof beyond the longitudinal frame members 14, 15, by a U-bolt assemblies 49.

A packer wheel or ground wheel 50 trails the covering disks 45, 46 to pack down the filled seed slot. Ground wheel 50 is carried on a short axle 52. Axle 52 is mounted to the trailing ends of first and second ground wheel arms 53, 54. The opposite ends of ground wheel arms 53, 54 are carried by a horizontal and lateral intermediate shaft or jackshaft 56. Jackshaft 56 is carried by plates 57 which depend from the longitudinal side beams 14, 15 of the frame 11. Plates 57 rotatably mount jackshaft 56. The interior ends of the packer wheel arms 53, 54 are assembled to bearings 58, 59, which are rotatably mounted upon jackshaft 56 permitting relative rotation thereof. Packer wheel arms 53, 54 are spring-loaded (not shown) with respect to the frame 11, so as to be biased in a downward direction for imposing a packing force upon the seed slot.

Figure 3:
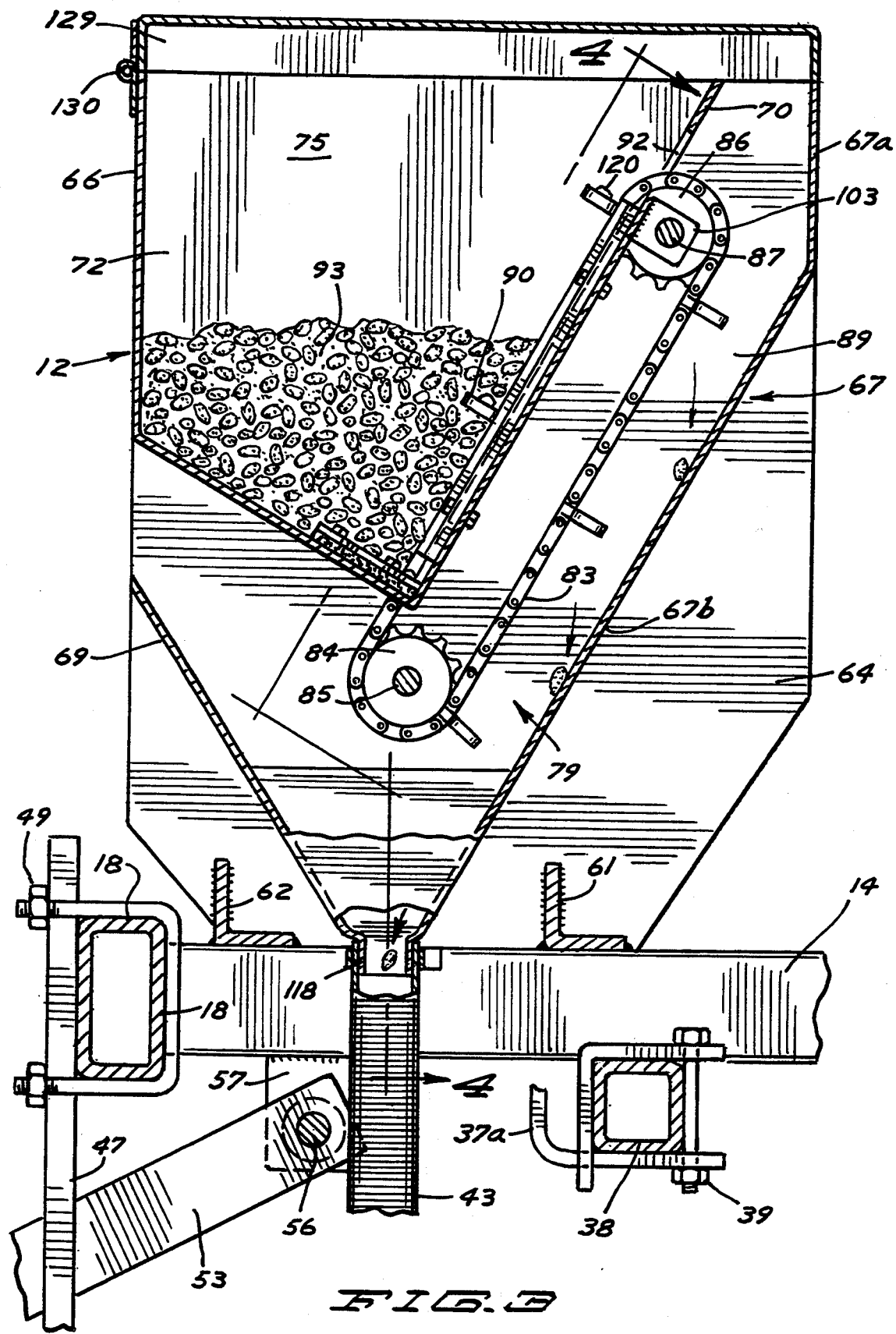
FIG. 3 is an enlarged sectional view of a portion of the seed planter of FIG. 2 taken along the line 3—3 thereof.

Seed planter housing 12 is mounted on the longitudinal frame beams 14, 15 by L-shaped support members 61, 62. The seed planter housing 12 has first and second vertical, lateral side walls 63, 64. Support beams 61, 62 are positioned laterally across frame beams 14, 15 and are secured thereto as by welding (FIG. 3). Housing side walls 63, 64 are affixed to the lateral ends of support members 61, 62 by suitable means, such as welding.

Housing 12 includes an upper back wall section 66 that extends between side walls 63, 64. A front wall 67 of housing 12 has an upper vertical section 67A and a lower, rearwardly inclined section 67B. A lower back wall section 69 is forwardly inclined in converging relationship to the lower front wall section 67B forming a transition or collection chamber for seeds leading to a seed drop opening communicating with the seed drop tube 43 as will be more fully described.

Figure 4:
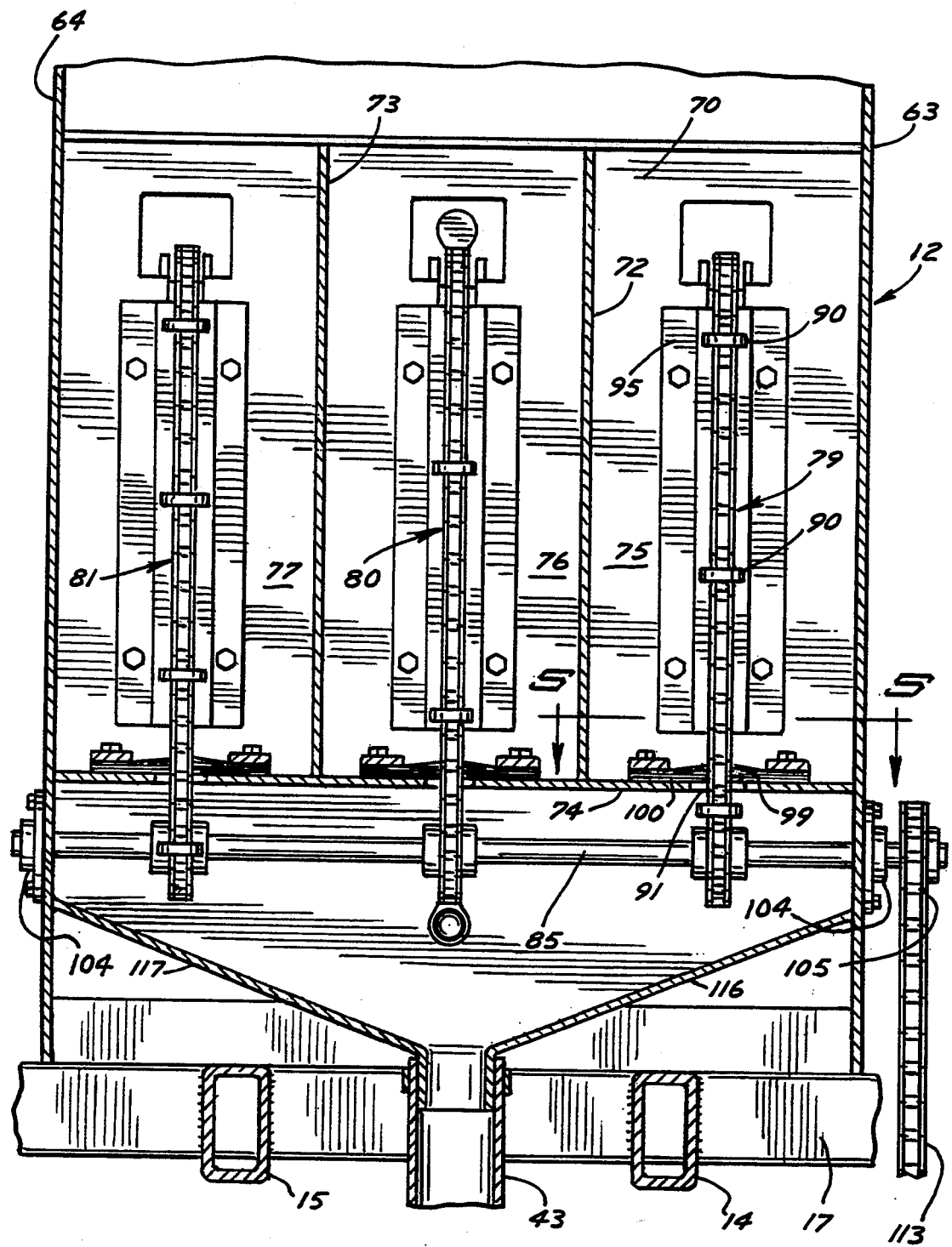
FIG. 4 is a sectional view of a portion of the seed planter of FIG. 3 taken along the line 4—4 thereof.

Interior walls of housing 12 form a seed box for containment of seed. The seed box is divided by partitions into separate seed bins. A seed box front wall 70 extends between the side walls 63, 64 of housing 12 and is positioned at an inclination, which can be parallel to that of the lower front wall section 67B. The seed box front wall 70 is located in spaced-behind relationship to front wall 67. A seed box bottom wall 71 extends at a forward inclination from the upper back wall section 66 to the lower end of the seed box front wall 70. A seed box, as shown in FIGS. 3 and 4, is defined by the seed box front wall 70, the seed box bottom wall 71, the upper back wall section and portions of the housing side walls 63, 64. As shown in FIG. 4, vertical partitions 72, 73 divide the seed box into first, second and third seed bins 75, 76, 77. More or fewer seed bins could be provided. The seed bins are separate so that each can hold a different species of seed or, in some cases, some other material to be planted with the seeds, such as a fertilizer pellet.

Each seed bin has a seed picking assembly. A sprocket and chain assembly associated with each seed bin includes a gathering chain for lifting seeds one at a time from the seed bin and depositing the seed in the collection chamber. The first, second and third seed bins 75, 76, 77 have sprocket and chain assemblies 79, 80, 81, respectively. As shown in FIG. 3, the first sprocket and chain assembly 79 in the first seed bin 75 includes a gathering chain 83 comprised as an endless loop roller-link chain. A drive sprocket 84 is mounted on a horizontal, lateral drive shaft 85. An idler sprocket 86 is mounted on a short idler shaft 87. Drive shaft 85 and idler shaft 87 are aligned parallel to the front seed box wall 70. Drive shaft 85 is located beneath the seed box and outside of it. Idler shaft 87 is located outside of the seed box approximate the forward seed box wall 70 and above drive shaft 85. Gathering chain 83 is carried by drive sprocket 84 and idler sprocket 86.

Drive sprocket 84 and idler sprocket 86 position the chain 83 so that the forward run of chain 83 passes upwardly through the seed bin 75 and the return run passes downwardly outside of it in the collection chamber 89. The gathering chain carries a plurality of seed cups 90. Each seed cup has a dish-shaped cup opening 88 to hold a seed. A seed cup inlet opening 91 (FIGS. 4 and 5), is located in the bottom wall 71 of seed bin 75 adjacent the front wall 70. Inlet opening 91 is of sufficient size to permit passage of the chain 83 and a seed cup. An outlet opening 92 is located in the front wall 70 of the seed box above the entrance opening 91. Outlet opening 92 is also of sufficient dimension to permit passage of the gathering chain 83 and a seed cup. Drive shaft 85 and idler shaft 87 are positioned such that the forward run of gathering chain 83 enters the seed bin 75 through the inlet opening 91 and exits the seed bin 75 through the outlet opening 92. A seed supply 93 is located in seed bin 75. The seed cups are upwardly open as they move on the forward run of gathering chain 83. As a seed cup 90 proceeds through seed bin 75, it picks up a single seed and carries it to the upper portion of the forward wall 70. The seed cup and attached chain section pass through the outlet opening 92 where the chain section engages the idler sprocket 86. As the chain section passes over the idler sprocket 36, the cup is inverted and drops the seed into the collection chamber 89.

A chain guide 95 is affixed to the inside of the front wall 70 between the inlet opening 91 and outlet opening 92. Chain guide 95 includes a flat base 96 affixed to the front wall 70 and a pair of parallel spaced apart ribs 97 positioned to straddle and guide the forward run of the gathering chain 83 as it moves into the seed bin 75.

A yieldable closure covers the inlet opening to prevent seed loss. As shown in FIG. 5, the entrance opening 91 is covered by a brush assembly to prevent seeds from falling through it. A pair of brushes 99, 100 extend in opposed relationship over the inlet opening 91 and terminate approximately midway thereof whereby a cup moving through the opening will spread the brushes apart and continue to move. Mounting plates 101 are fastened to the bottom wall 71 of seed bin 75 to hold the brushes in place. Other movable closure means could be used as well.

Idler shaft 87 of the first sprocket chain assembly 79 is rotatably mounted on plates 103 that are fastened to the outside of the front wall 70. Each sprocket chain assembly has a separate idler shaft for the purpose of carrying the idler sprocket.

Drive shaft 85 extends horizontally between the side walls 63, 64 of housing 12. Bearing assemblies 104 are affixed to the sides of housing 12 and carry the ends of the drive shaft 85 for axial rotation thereof. One end of drive shaft 85 extends outwardly beyond a side wall 63 and carries a drive shaft transmission sprocket 105. As shown in FIGS. 1 and 2, ground wheel 50 also operates as a power or drive wheel. A power sprocket 107 is mounted on the axle 52 of the ground wheel 50. A first transmission sprocket 108 is mounted on jackshaft 56. A first transmission chain 109 is trained between the power sprocket 107 and the first transmission sprocket 108 in parallel relation to and disposed adjacent the first packer wheel arm 53. A tension pulley 110 is mounted on the ground wheel arm 53 to tension the chain 109.

The outer end of jackshaft 56 carries a second transmission sprocket 112. The second transmission sprocket 112 is located on the same side of housing 12 as the drive shaft transmission sprocket 105. A second transmission chain 113 connects the second transmission sprocket 112 to the drive shaft transmission sprocket 105. A second tension pulley 114 is fastened to side wall 63 of housing 12 and contacts the second transmission gear 113. Rotation of the ground wheel 50, as it travels over the ground, is effective to drive the drive shaft 85 through the first transmission chain 109, the first and second transmission sprockets 108, 112 and the drive shaft transmission sprocket 105. Other power means can be provided to power the drive shaft. A hydraulic motor, for example, can be mounted on the frame and fixed by a suitable transmission to the drive shaft to power the drive shaft.

Seed collector 89 is comprised as a chamber defined by lower forward wall section 67B of housing 12, the lower rear wall section 69 and convergent bottom walls 116, 117 of housing 12. Bottom walls 116, 117 converge inwardly from side walls 63, 64 of housing 12 and are shaped to fit with the converging lower front wall section 67B and lower back wall section 69. The four walls converge to a seed snout 118, providing a seed drop opening. The upper end of seed drop tube 43 is fitted over the seed snout 118 and fastened by suitable means. Seeds deposited in the collector 89 travel by gravity to seed snout 118 and then into the seed drop tube 43.

Seed cups 90 are readily connected and disconnected from the gathering chains. This permits interchanging seed cups of various configurations to handle various different seed species. It also permits regulation of the number and spacing between seed cups on a particular chain in order to meter the planting of seed from that particular seed bin. The spacing of the seed cups can be coordinated with respect to the various gathering chains to regulate the spacing of various seed species being planted.

Referring to FIGS. 6 through 8, there is shown a seed cup 90 mounted with respect to a link of the gathering chain 83 of the sprocket chain assembly 79 and carrying a seed 120 in seed cup opening 88. The chain link has the usual side plates 122, 123 and connecting rollers 125. A U-shaped clip 124 engages the side plates and has a front face 126. Screws 127 are threaded through the front face 126 of the clip 124 and into the seed cup 90. Seed cup 90 is readily removed by removal of the screws 127. Alternatively, the seed cups can be permanently affixed to master links of the chain. The master links can be inserted in the chain at desired seed cup locations. Cups are added or subtracted from the chain simply by replacement of master links.

Housing 12 has a cover 129 connected to the back wall 66 by a hinge 130 and adapted to be held in place by a hasp assembly 131. Opening of the cover 129 permits loading the various seed bins with different species of seeds. While three bins are shown, a seed planter could be configured with more or less. The various seeds are deposited in the seed bins. The seed cups are arranged on the various gathering chains according to the desired space intervals between seeds being planted. For example, seeds may alternately be planted of first, second and third species. Alternatively, two seeds of one species may be planted and then a third of another.

The seed planter is towed over the ground to be planted. The no-till disk 33 clears away trash. The chisel tine 37 opens a seed slot in the ground. The planting shoe 42 follows the end of the chisel tine and holds the seed slot open. Seeds are picked from the various bins by the seed cups 90. The seeds are deposited in the collector 87, where they fall by gravity to the seed tube 43. The seeds move from the seed tube 43 through the planting shoe 42 into the seed slot. Seed is deposited in the bottom of the seed slot. The seed slot is closed by the covering disks 45. Ground wheel 50 follows and packs down the seed slot. Rotation of the ground wheel 50 operates the drive shaft 85 to move the gathering chains through the bins.

The seed box of the seed planter according to the invention can have one or more seed bins. The multiple seed bin configuration is useable for planting seeds of different species. For example, in a wetland reforestation effort, different seed bins can contain seeds for oak, hickory, and ash trees. The seeds can be planted in regulated intermixed relationships.

The seed planter, according to the invention, can be equipped with a single seed bin. Such a configuration finds application in farming for the planting or corn or soybean or the like. When switching from planting one seed to another, the farmer need only change the seed cups according to the seed being planted. The need for different planting equipment according to the crop is eliminated. The quantity of seeds planted per linear foot is readily regulated.

Figure 9:
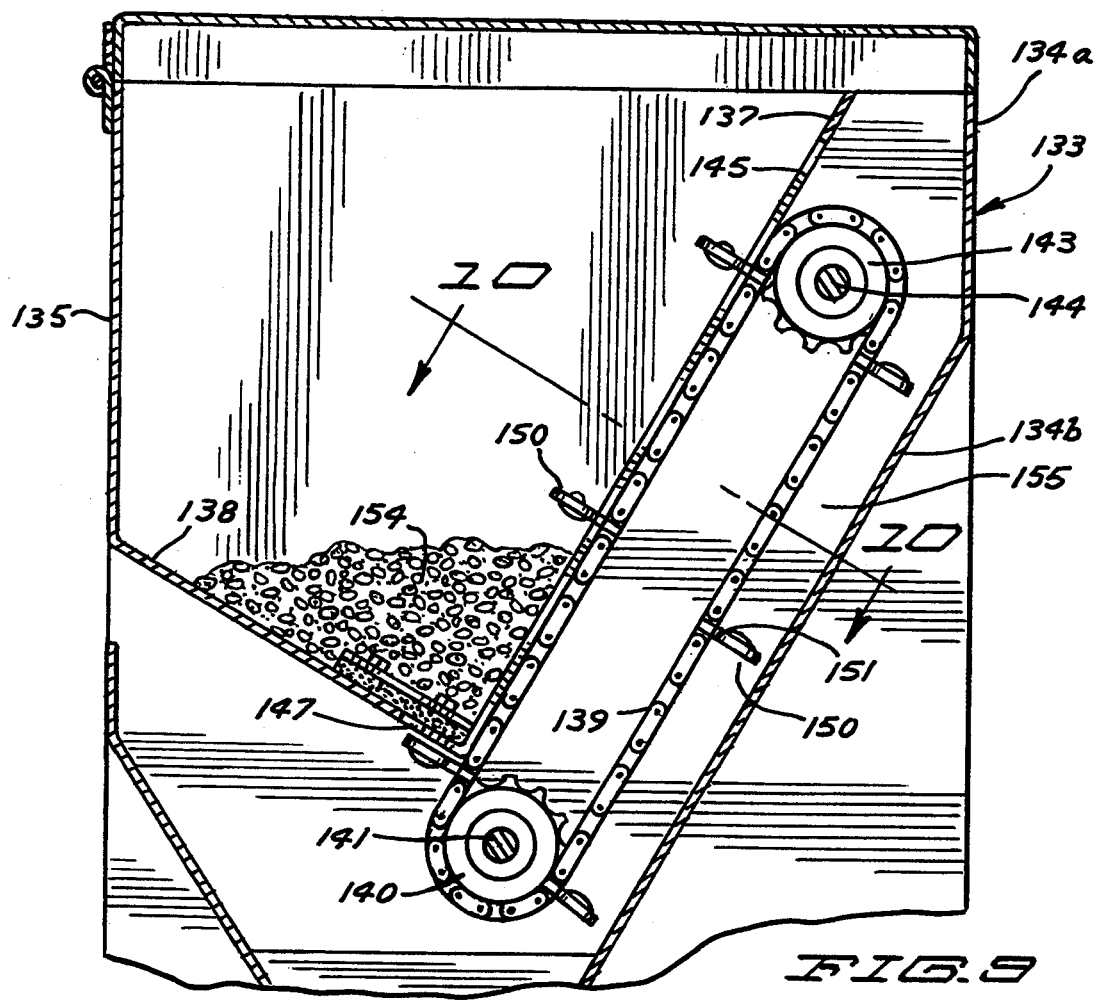
FIG. 9 is a sectional view of a seed planter like the view of FIG. 3, but showing a second embodiment of a gathering chain mounted with respect to a seed bin and seed collector according to the invention.
Figure 10:
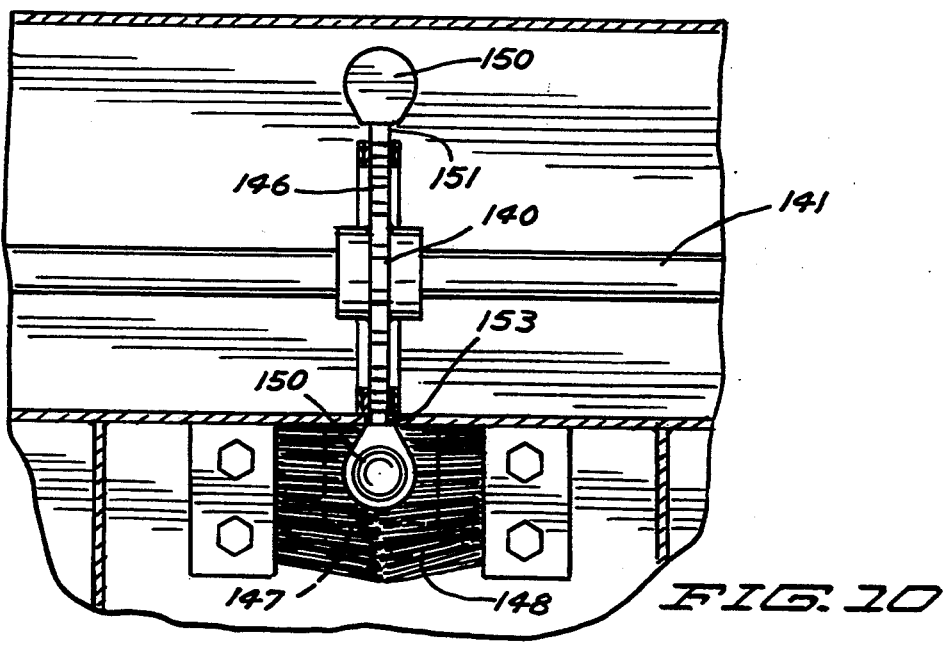
FIG. 10 is an enlarged sectional view of a portion of the seed planter of FIG. 9 taken along the line 10—10 thereof.

An alternative embodiment of a sprocket and chain assembly is shown in FIGS. 9 and 10 where the gathering chain is located exterior to the seed box in its entirety. Seed cups are mounted on arms that extend into the seed bin through a slot in the front wall of the seed box. This configuration is desirable for planting of smaller seeds, such as corn and soybeans, when the chain itself might otherwise be prone to pick up seed from the seed bin.

In FIGS. 9 and 10, a seed planter housing 133 has an upper front wall section 134A and a lower front wall section 134B that is rearwardly inclined. The housing has an upper back wall section 135 which, together with a seed box front wall 137 and a seed box bottom wall 138, define a seed box partitioned into seed bins. A gathering chain 139 is mounted between a drive sprocket 140 mounted on a drive shaft 141 and an idler sprocket 143 mounted on an idler shaft 144. The forward or upward run of the gathering chain 139 is outside of the seed bin, but closely parallel to the seed box front wall 137. The front wall 137 has an outlet opening 145 of sufficient size to accommodate the passage of seed cups. The bottom wall 138 has an inlet opening 147 also of sufficient size to permit passage of the seed cups into the seed bins. Brushes 148 cover the inlet opening 147 to prevent seeds from falling through.

Seed cups 150 are attached to outer ends of arms 151. The other end of each arm 151 is attached as by welding to a master link of the gathering chain 139. The front wall 137 has a continuous elongate slot 153. Slot 153 extends from the outlet opening 145 in the front wall 137 to the inlet opening 147 in the bottom wall 138. The slot 153 is of sufficient width to permit passage of the arms 151.

In use, a supply of seeds 154 is placed in the bin. The gathering chain 139 is powered as previously described. The seed cups move around the drive sprocket 140 and then up through the inlet opening 147 in the bottom wall 138. The arms travel through the slot 153 and up through the seeds. Each cup, as it travels through the seeds, picks a single seed. The cup travels upwardly to the top of the gathering chain, then through the opening 145 and over the idler sprocket 143, whereupon the cup is inverted and the seed drops out of the cup. The seed travels down the collection chamber 155 to the seed tube, as previously described.

While the embodiments of the invention have been shown and described with respect to a sprocket chain, it is understood that the term "gathering chain" is meant to encompass other such endless loop conveyors to which the seed cups may be attached and operated according to the embodiments shown.

We claim:

1. A seed planter comprising:

frame means for movement over ground to be planted with seed;

said frame means carrying ground working means for substantially continuously opening a seed slot in the ground, depositing seed in the seed slot, and closing the seed slot;

at least one seed bin attached to the frame means;

a collector located adjacent the seed bins, said collector having seed drop means for seed delivery, located at a lower portion thereof;

an endless loop gathering chain means associated with each seed bin for lifting seed from the seed bin, said gathering chain means having a forward run in a generally upward direction and a return run in a generally downward direction;

at least one seed cup attached to the gathering chain means and having a cup opening, said seed cup orientated on the gathering chain means so as to be upwardly open on the forward run of the gathering chain means;

an inlet opening at the bottom of each seed bin and an outlet opening toward an upper portion of the seed bin located above the inlet opening and open to the collector;

drive means and idler means affixed to the frame and connected to each gathering chain means for moving and guiding the gathering chain means;

said drive means and idler means positioning the gathering chain means so that upon the forward run of the gathering chain means, the seed cup is moved through the inlet opening of the associated seed bin, upwardly through the seed bin where the seed cup can pick a seed as it moves through a seed supply stored in the bin, and transport the seed to and through the outlet opening to drop the seed in the collector for planting;

each gathering chain means including a roller link chain, said drive means including a drive sprocket corresponding to each roller link chain and connected to the drive shaft, and an idler sprocket connected to the frame means;

fastening means releasably connecting each seed cup to a link of the chain to permit interchanging seed cups and varying the spacing between seed cups on the chain.

2. The seed planter of claim 1 wherein:

said drive means includes a drive shaft connected to each gathering chain means.

3. A seed planter comprising:

frame means for movement over ground to be planted with seed;

said frame means carrying ground working means for substantially continuously opening a seed slot in the ground, depositing seed in the seed slot, and closing the seed slot;

at least one seed bin attached to the frame means;

a collector located adjacent the seed bins, said collector having seed drop means for seed delivery located at a lower portion thereof;

an endless loop gathering chain means associated with each seed bin for lifting seed from the seed bin, said gathering chain means having a forward run in a generally upward direction and a return run in a generally downward direction;

at least one seed cup attached to the gathering chain means and having a cup opening, said seed cup orientated on the gathering chain means so as to be upwardly open on the forward run of the gathering chain means;

an inlet opening at the bottom of each seed bin and an outlet opening toward an upper portion Of the seed bin located above the inlet opening and open to the collector;

drive means and idler means affixed to the frame and connected to each gathering chain means for moving and guiding the gathering chain means; and said drive means and idler means positioning the gathering chain means so that upon forward run of the gathering chain means, the seed cup is moved through the inlet opening of the associated seed bin, upwardly through the seed bin where the seed cup can pick a seed as it moves through a seed supply stored in a bin, and transport the seed to and through the outlet opening to drop the seed in the collector for planting;

said drive means including a drive shaft connected to each gathering chain means;

a ground wheel, means connecting the ground wheel in training relationship to the frame means and in rolling engagement with the ground when the frame means is moved over the ground, said drive means including a power transmission means connected between the ground wheel and the drive shaft.

4. The seed planter of claim 3 including:

yieldable closure means for covering the inlet openings of the seed bins.

5. The seed planter of claim 3 wherein:

said collector includes convergent wall means converging at a seed snout, and a seed tube connected to the seed snout.

6. The seed collector of claim 3 wherein:

each gathering chain means includes a roller link chain, said drive means including a drive sprocket corresponding to each roller link chain and connected to the drive shaft, and an idler sprocket connected to the frame means.

7. The seed planter of claim 6 including:

a plurality of seed cups located on each chain, and means releasably connecting each seed cup to the chain to permit interchanging seed cups and varying the spacing between seed cups on the chain.

8. A seed planter comprising:

a frame movable over ground to be planted with seed;

said frame carrying ground working means for substantially continuously opening a seed slot, depositing seed in the seed slot, and closing the seed slot;

a housing connected to the frame, said housing having walls defining a seed box and a collector adjacent the seed box, said collector having a seed drop opening at a lower portion thereof;

at least one partition dividing the seed box into a plurality of seed bins;

each seed bin having a bottom wall and an upright wall;

a chain assembly associated with each seed bin including an endless loop gathering chain, and a drive sprocket and an idler sprocket carrying the gathering chain, said gathering chain having a forward run in a generally upward direction and return run in a generally downward direction;

a plurality of seed cups removably attachable to the gathering chain, each seed cup having a seed cup opening for accommodation of a seed;

each seed bin having an inlet opening at a lower portion thereof and an outlet opening at an upper portion thereof;

said drive sprocket and idler sprocket affixed to the housing to position the forward run of the gathering chain so that it passes through the inlet opening, upwardly in the seed bin, and out the outlet opening;

means for driving the drive sprockets to move the gathering chains;

at least one seed cup releasably attached to each gathering chain oriented to be upwardly open on the forward run of the gathering chain as the seed cup moves through the seed bin to pick a seed from the seed bin and discharge the seed to the collector upon passing through the outlet opening and over the idler sprocket where the seed cup moves to a downwardly open orientation; and a drive shaft rotatably affixed to the housing for axial rotation, said drive sprockets being affixed to the drive shaft, said means for driving the drive sprockets including power means to rotate the drive shaft.

9. The seed planter of claim 8 including:

a wheel attached to the frame and rotatable as the frame is moved over the ground, and power transmission means connected between the wheel and the drive shaft to power the drive shaft as the frame is moved over the ground.

10. The seed planter of claim 8 wherein:

said inlet openings are located in the bottom walls of the seed bins and said outlet openings are located in the upright walls of the seed bins.

11. The seed planter of claim 10 including:

yieldable closure means covering the inlet openings.

12. The seed planter of claim 8 wherein:

said housing includes a pair of upright side walls, a drive shaft rotatably connected between the side walls, said drive shaft carrying the drive sprockets;

a ground wheel attached to the frame and rotatable as the frame is moved over the ground; and a transmission chain assembly connected between the ground wheel and the drive shaft to rotate the drive shaft as the ground wheel moves over the ground.

13. The seed planter of claim 12 wherein:

said seed box is defined, at least in part, by a front wall extending between the side walls of the housing, and a bottom wall extending between the side walls of the housing, and including at least one partition being connected to the bottom wall and front wall of the seed box to form a plurality of seed bins, said front wall of the seed box providing the upright wall for the seed bins and said bottom wall of the seed box providing the bottom wall for the seed bins, said housing having a front wall spaced ahead of the front wall of the seed box whereby said collector is formed between the front wall of the seed box and the front wall of the housing.

14. The seed planter of claim 12 wherein:

said drive shaft has an end portion extending outwardly of a housing side wall and carrying a drive shaft power sprocket;

a jackshaft assembled to the frame beneath the housing in a lateral, horizontal orientation;

said jackshaft carrying a first transmission sprocket and a second transmission sprocket;

said ground wheel carrying a power transmission sprocket; and said transmission chain assembly including a first power transmission chain connected between the power transmission sprocket of the ground wheel and the first transmission sprocket on the jackshaft, and a second transmission chain connected between the second transmission sprocket on the jackshaft and the drive shaft power sprocket.

15. A seed planter comprising:

a frame movable over ground to be planted with seeds;

said frame carrying ground working means for substantially continuously opening a seed slot, depositing seed in the seed slot and closing the seed slot;

a housing mounted on the frame and having a pair of lateral side walls, a back housing wall and a front housing wall;

a seed box front wall extended laterally between the side walls of the housing rearwardly of the housing front wall;

a seed box bottom wall extended between the housing side walls and connected to the lower edge of the seed box front wall at the front edge thereof and connected to the housing back wall at the rear edge thereof;

one or more vertical partitions generally parallel to the housing side walls and connected to the seed box front wall and seed box bottom wall to form a plurality of seed bins;

a collector formed between the front wall of the housing and the front wall of the seed box and having downwardly converging collector walls terminating in a seed drop opening;

a generally horizontal drive shaft extended between and rotatably assembled to the side walls of the housing for axial rotation;

power means for rotation of the drive shaft;

a plurality of seed picking assemblies, one seed picking assembly associated with each seed bin, each seed picking assembly including a gathering chain, a drive sprocket mounted on the drive shaft and an idler sprocket connected to the housing, said gathering chain being assembled to the drive sprocket and the idler sprocket;

each seed bin having an inlet opening in the bottom wall, and an outlet wall located above the inlet opening;

each gathering chain having a forward run in a generally upward direction, and a return run in a generally downward direction;

a plurality of seed cups releasably attached to the gathering chains, oriented to be upwardly open when travelling on the forward run of the gathering chain; and each drive sprocket and idler sprocket being positioned to position the gathering chain with respect to the associated seed bin so that the forward run of the gathering chain is closely proximate the seed box front wall so that upon the forward run of the gathering chain, seed cups enter the seed bin through the inlet opening and travel upward through the seed bin to pick a seed, and exit the seed bin through the outlet opening, travelling over a sprocket and dropping the seed into the collector.

16. The seed planter of claim 15 including:

a slot in the seed box front wall extended between the inlet opening and the outlet opening of each seed bin;

said forward run of the gathering chain positioned outside of the seed box wall; and said seed cups affixed to the gathering chains by elongate arms, each said arm adapted to engage and travel through the slot of the seed bin in the seed box front wall when the corresponding seed cup passes through the inlet opening of the seed bin bottom wall.

17. The seed planter of claim 16 including:

a ground wheel connected to the frame; and power drive transmission means connected between the ground wheel and the drive shaft to power the drive shaft upon rotation of the ground wheel.

18. The seed planter of claim 17 wherein:

said transmission means includes sprocket and chain assemblies connected between the ground wheel and the drive shaft.

19. A seed planter comprising:

a frame movable over ground to be planted with seed;

said frame carrying ground working means for substantially continuously opening a seed slot, depositing seed in the seed slot, and closing the seed slot;

a housing connected to the frame, said housing having walls defining a seed box and a collector adjacent the seed box, said collector having a seed drop opening at a lower portion thereof;

said seed box having at least one seed bin;

each seed bin having a bottom wall and an upright wall;

a chain assembly associated with each seed bin including an endless loop gathering chain, a drive sprocket and an idler sprocket carrying the gathering chain, said gathering chain having a forward run in a generally upward direction and a return run in a generally downward direction;

a plurality of seed cups affixed to the gathering chains, each seed cup having a seed cup opening for accommodation of a seed, an arm connected at one end to the seed cup and at the other end to the gathering chain;

each seed bin having an inlet opening at a lower portion thereof and an outlet opening at an upper portion thereof;

a slot extended between the inlet opening and the outlet opening of each seed bin;

said drive sprocket and idler sprocket affixed to the housing to position the forward run of the gathering chain parallel cup through the inlet opening and up through the seed bin with the arm attached to the seed cup and travelling through said slot, so that the seed cup will pick a seed from a seed bin and discharge, the seed to the collector upon passing through the outlet opening; and means for driving the drive sprockets to move the gathering chains.

20. The seed planter of claim 19 including:

a drive shaft rotatably affixed to the housing for axial rotation, said drive sprockets being affixed to the drive shaft, and said means for driving the drive sprockets including power means to rotate the drive shaft.

21. The seed planter of claim 20 including:

a ground wheel attached to the frame, and power drive transmission means connected between the ground wheel and the drive shaft to power the drive shaft upon rotation of the ground wheel.

22. The seed planter of claim 21 wherein:

said transmission means includes sprocket and chain assemblies connected between the ground wheel and the drive shaft.

23. The seed planter of claim 22 including:
yieldable closure means covering the inlet openings to the seed bins.

24. The seed planter of claim 19 wherein:
said seed cups and arms are removably connected to the gathering chain for varying the spacing between seed cups on a particular chain.

25. The seed planter of claim 19 including:
at least one partition dividing the seed box into a plurality of seed bins.

26. The seed planter of claim 25 including:
a drive shaft rotatably affixed to the housing for axial rotation, said drive sprockets being affixed to the drive shaft, and means for driving the drive sprockets;
a ground wheel attached to the frame, and power drive transmission means connected between the ground wheel and the drive shaft to power the drive shaft upon rotation of the ground wheel.

27. The seed planter of claim 26 wherein:
said seep cups are removably connected to the gathering chain for varying the spacing between seed cups on a particular chain.

* * * * *